United States Patent
Dong et al.

(10) Patent No.: US 10,384,558 B2
(45) Date of Patent: Aug. 20, 2019

(54) CRUISE CONTROL SYSTEM FOR ELECTRICAL MOBILITY SCOOTER AND ELECTRICAL MOBILITY SCOOTER THEREWITH

(71) Applicant: STG Consulting Co., Ltd., Victoria, Mahe (SC)

(72) Inventors: Qian Dong, Los Angeles, CA (US); Zhongwei Chu, Shanghai (CN)

(73) Assignee: STG CONSULTING CO., LTD., Victoria, Mahe (SC)

( * ) Notice: Subject to any disclaimer, the term of this patent is extended or adjusted under 35 U.S.C. 154(b) by 133 days.

(21) Appl. No.: 15/715,928

(22) Filed: Sep. 26, 2017

(65) Prior Publication Data

US 2018/0086226 A1    Mar. 29, 2018

Related U.S. Application Data

(60) Provisional application No. 62/400,345, filed on Sep. 27, 2016.

(51) Int. Cl.
| | |
|---|---|
| *B60K 7/00* | (2006.01) |
| *B60L 15/20* | (2006.01) |
| *B60R 16/03* | (2006.01) |
| *B60K 31/04* | (2006.01) |

(Continued)

(52) U.S. Cl.
CPC ............ *B60L 15/20* (2013.01); *B60K 7/0007* (2013.01); *B60K 31/04* (2013.01); *B60R 16/0315* (2013.01); *B62K 5/007* (2013.01); *B62K 5/025* (2013.01); *B60L 2200/24* (2013.01); *B60Y 2200/12* (2013.01); *Y02T 10/645* (2013.01); *Y02T 10/72* (2013.01); *Y02T 10/7275* (2013.01)

(58) Field of Classification Search
None
See application file for complete search history.

(56) References Cited

U.S. PATENT DOCUMENTS 7,046,917 B1    5/2006  Lin
7,243,746 B1 *  7/2007  Vasant ................. B60L 53/00
                                                            180/6.5

(Continued)

FOREIGN PATENT DOCUMENTS

EP    0588353 A2    3/1994
EP    0588353 A3    3/1994

(Continued)

OTHER PUBLICATIONS

EPO, European Search Report, dated Jan. 30, 2018, in European Patent Application No. EP 17 19 3552, related to U.S. Appl. No. 15/715,928.

*Primary Examiner* — Jonathan M Dager
*Assistant Examiner* — Garrett F Evans
(74) *Attorney, Agent, or Firm* — Thedford I. Hitaffer; Hitaffer & Hitaffer, PLLC

(57) ABSTRACT

An improved cruise control system is configured to be retrofit with an electrical mobility scooter. The cruise control system has module that is a self-contained unit, comprising an assembly of electronic components and associated wiring, including a processor and memory with software for processing by the processor, which performs defined tasks, and which is linked with the scooter controller, power supply and scooter throttle control.

12 Claims, 7 Drawing Sheets

(51) Int. Cl.
  *B62K 5/007* (2013.01)
  *B62K 5/025* (2013.01)

(56) References Cited

U.S. PATENT DOCUMENTS

| | | | | |
|---|---|---|---|---|
| 2006/0180368 A1* | 8/2006 | Hsieh | .................. | A61G 5/04 |
| | | | | 180/170 |
| 2008/0154463 A1* | 6/2008 | Kuo | .................. | A61G 5/045 |
| | | | | 701/41 |
| 2011/0071711 A1* | 3/2011 | Sharp | .................. | A61G 5/041 |
| | | | | 701/22 |
| 2017/0240169 A1* | 8/2017 | Coulter | .................. | A61G 5/04 |

FOREIGN PATENT DOCUMENTS

| | | |
|---|---|---|
| KR | 100250536 B1 | 4/2000 |
| WO | 2007054104 A1 | 5/2006 |

* cited by examiner

CRUISE CONTROL SYSTEM FOR ELECTRICAL MOBILITY SCOOTER AND ELECTRICAL MOBILITY SCOOTER THEREWITH

CROSS-REFERENCE TO RELATED APPLICATIONS

This application claims the benefit of U.S. Provisional Application No. 62/400,345, filed Sep. 27, 2016, the disclosure of which is incorporated herein by reference.

BACKGROUND OF THE INVENTION

This invention relates in general to electric mobility scooters and more particularly, to an improved cruise control system for electric mobility scooters.

To operate any existing electric mobility scooter, a driver must press against a spring force of a throttle control, such as a single-ended or unipolar wig-wag throttle control, with their thumbs. If driving the scooter long distances, drivers will endure pain associated with pressing against the spring force of the throttle control with their thumb for a correspondingly long period of time.

SUMMARY OF THE INVENTION

This invention relates to a cruise control system for electric mobility scooters. The cruise control system remains operable to set the driving speed of the scooter without continually pressing against the spring force of the scooter throttle control. The thumbs of scooter drivers are free once the cruise control system is activated and the driving speed is set. The driving speed can be set by simply pressing a button. The cruise control system maintains a steady speed as set by the driver.

One embodiment of a basic cruise control system has basic features. Another embodiment is an advanced cruise control system with additional or advanced features.

Various advantages of this invention will become apparent to those skilled in the art from the following detailed description of the preferred embodiment, when read in light of the accompanying drawings.

DETAILED DESCRIPTION OF THE PREFERRED EMBODIMENT

A cruise control system, described herein below, with reference to the attached drawings, is suitable for use with electric mobility scooters. Examples of such scooters include but are not limited to scooters as shown and described in U.S. Pat. No. 5,950,755, issued Sep. 14, 1999, to Kenneth Kemmerer et al., U.S. Pat. No. 6,273,206, issued Aug. 14, 2001, to Allen Bussinger, U.S. Pat. No. 6,276,480, issued Aug. 21, 2001, to Kurt Aregger, U.S. Pat. No. 6,530,445, issued Mar. 11, 2003, to Michael J. Flowers, and U.S. Pat. No. 8,820,461, issued Sep. 2, 2014, to Yasuo Shinde, the disclosures of which are incorporated herein by reference.

Figure 1:
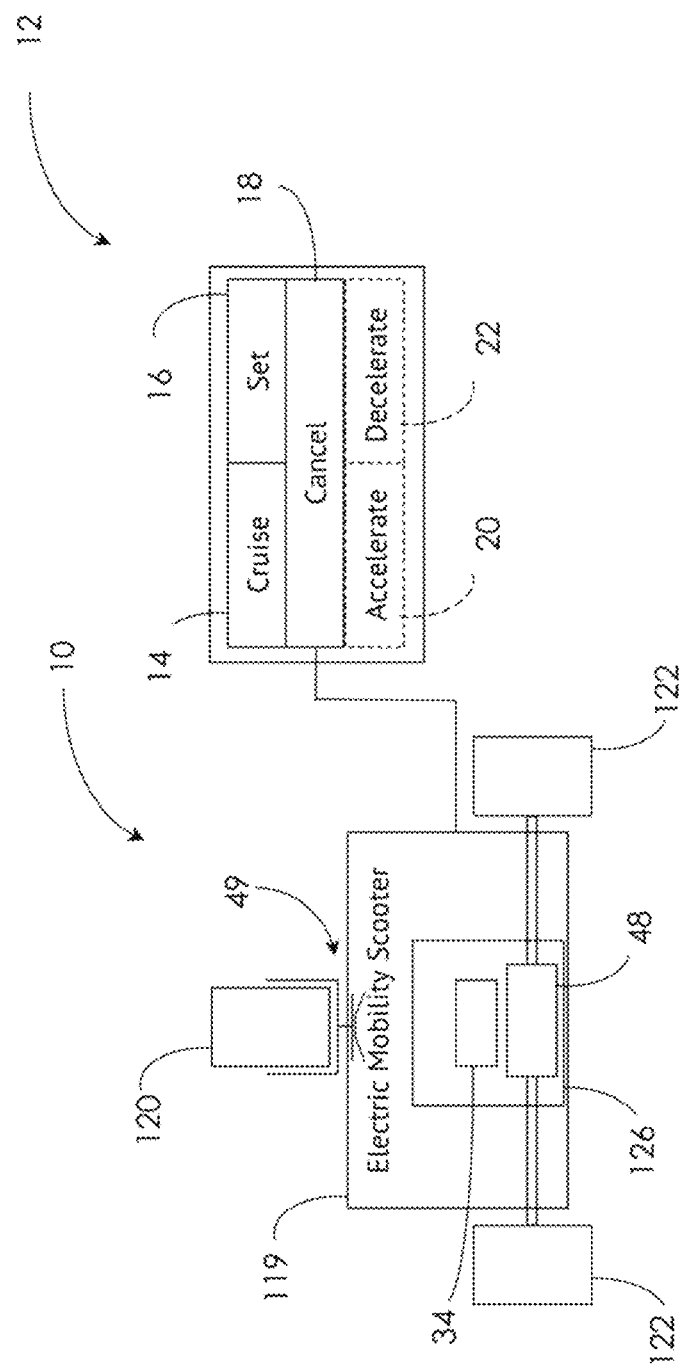
FIG. 1 is a block diagram of an electric mobility scooter and a controller of an exemplary embodiment of a basic cruise control system, shown in solid line, with advanced features shown in broken line.

Referring now to the drawings, there is illustrated in FIG. 1 a block diagram of an electric mobility scooter 10 and a control 12 of an exemplary embodiment of a basic cruise control system, shown in solid line, with additional or advanced features shown in broken line.

An exemplary electric mobility scooter 10 may be comprised of base frame 119 supported in a relation to a supporting surface by a front wheel 120 (or alternatively, a pair of laterally spaced front wheels), and at least one rear wheel, although a pair of laterally spaced rear wheels 122 is preferred. A seat 126 is supported in relation to the base frame 119, preferably in a removable fashion, to support a driver in a seated position in relation to the base frame 119. The front wheel 120 is steered by the driver via a tiller in a conventional manner. The rear wheels 122 are driven by a conventional battery-operated motor assembly, preferably, a transaxle motor assembly, via a power supply 34 and a scooter controller 48. The speed and/or direction of the transaxle motor assembly is controlled by a conventional scooter throttle control 49 (e.g., a wig-wag), such as by pressing against a spring force of the scooter throttle control 49 with the driver's thumb. The scooter throttle control 49 may be comprised of a mechanical throttle potentiometer, which is connected to the scooter controller 48. As is well known in the art, relative displacement of the scooter throttle control 49 produces a signal, which is received by the scooter controller 48, which correspondingly controls the speed and/or direction of the transaxle motor assembly.

The cruise control system according to the present invention comprises a module (e.g., a self-contained unit or item, such as an assembly of electronic components and associated wiring, including a processor and memory with software, which itself performs a defined task and can be linked with other units or items, or to a larger system). The cruise control system is configured to be a retrofit system to an electric mobility scooter 10, which eliminates the need for the driver to have to press against the spring force of the scooter throttle control 49, and thus eliminates the pain associated therewith.

The cruise control system comprises a plurality or controls 14, 16, 18, which may be in the form of switches or buttons, such as the "Cruise", "Set" and "Cancel" buttons shown. A first control 14 may be comprised of a "Cruise" button, which may be a bi-stable latching button, which is operational in both "On" and "Off" states. Pressing the "Cruise" button may activate the cruise control system. Pressing the "Cruise" button again, a second time, may deactivate the cruise control system. When pressed and in the "On" state, the "Cruise" button may be illuminated (i.e., backlit, for example, by an LED or other suitable light), or a LED or other suitable light close to the "Cruise" button may be turned on, or some other visual indicator (i.e., first visual indicator 40) may be provided, to provide an indication to the driver of the scooter 10 that the cruise control system is ready to control the driving speed of the scooter (i.e., take over the throttle). A second control 16 may be in the form of a "Set" button. When the cruise control system is activated, depressing or tapping the "Set" button causes the scooter 10 to maintain the speed at which the driver is currently driving, and then the driver can let go of the scooter throttle control 49 (e.g., the wig-wag). When the speed is set, the "Set" button may be illuminated (i.e., backlit, for example, by an LED or other suitable light), or a LED or other suitable light close to the "Set" button may be turned on, or some other visual indicator (i.e., second visual indicator 42) may be provided, to provide an indication to the driver of the scooter 10 that the speed is set. A third control 18 may be in the form of a "Cancel" button. Pressing the "Cancel" button may effectively change the cruise control operating status from an "On" state to an "Off" state. When pressed, the "Cancel" button may disengage the cruise control (i.e., releases control of the scooter 10 from the set speed). It should be appreciated that the cruise control can be disengaged when the driver presses the scooter throttle control 49, or depresses the "Cancel" button. In this regard, it should be appreciated that the "Cancel" button may be optional. In any event, with the cruise control disengaged, the driver gains control of the throttle (e.g., the wig-wag) of the scooter 10. It should be appreciated that the second and third controls 16, 18 may be momentary switches.

It should be appreciated that the cruise control system may include additional controls for advanced features. For example, shown in the drawings, two additional or optional controls 20, 22 (i.e., third and fourth controls) are provided. These controls 20, 22 may in the form of buttons, such as "Accelerate" and "Decelerate" buttons, respectively. Holding down the "Accelerate" button may produce a continuous state to cause the scooter 10 to accelerate, and tapping the "Accelerate" button once may produce a temporary or momentary state to cause the scooter 10 to incrementally increase in speed (e.g., speed up 0.5 km/h). Holding down the "Decelerate" button may produce a continuous state to cause the scooter 10 to decelerate, and tapping the "Decelerate" button once may produce a temporary or momentary state to cause the scooter 10 to incrementally decrease in speed (e.g., slow down by 0.5 km/h). It should be appreciated that the fourth and fifth controls 20, 22 may be momentary switches.

Figure 2:
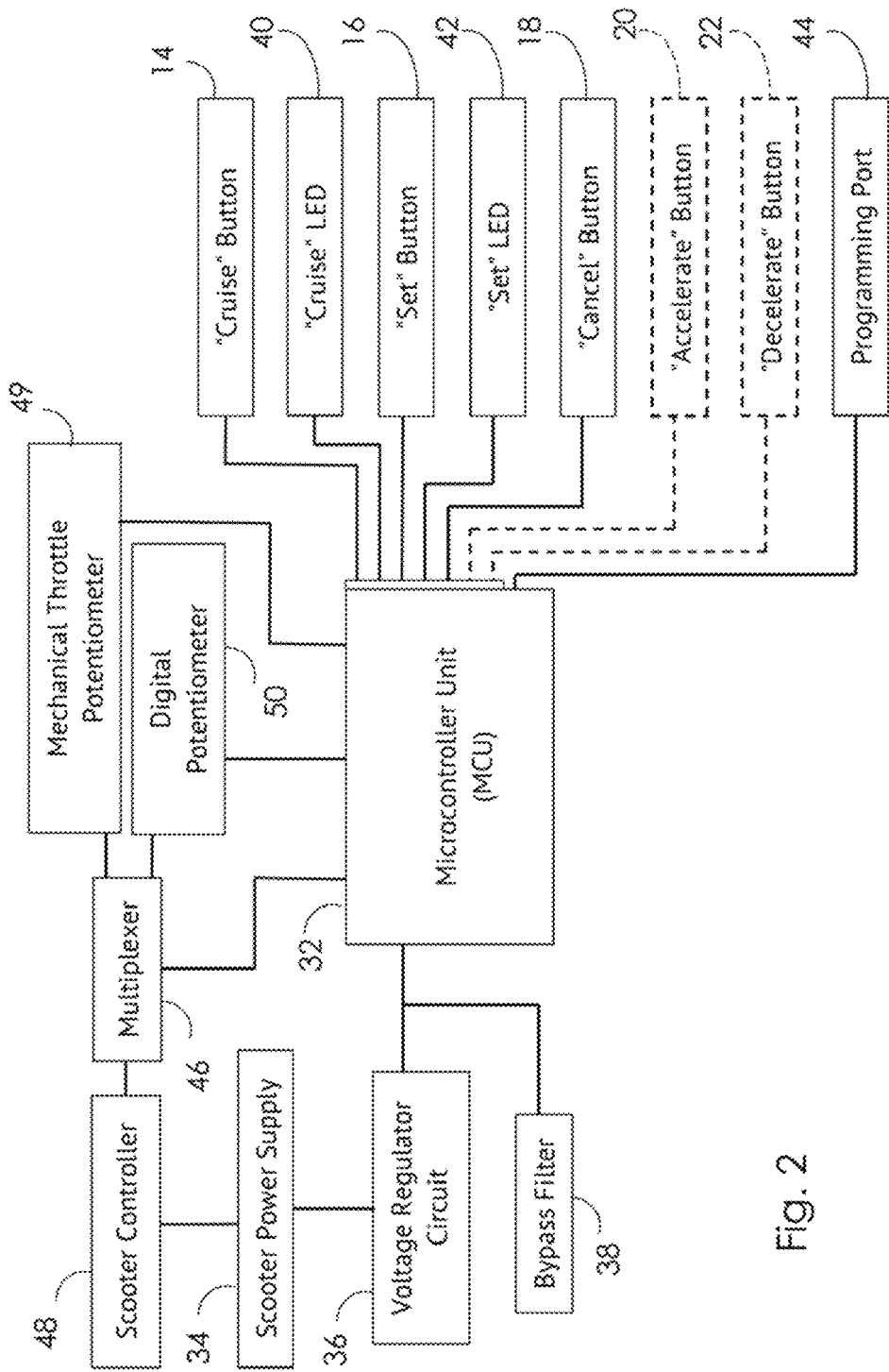
FIG. 2 is a block diagram of an exemplary embodiment of the basic cruise control system, shown in solid line, with advanced features shown in broken line.

In FIG. 2, a block diagram of an exemplary embodiment of the basic cruise control system 30 is shown in solid line, with advanced features shown in broken line. The cruise control system 30 comprises a microcontroller unit 32, which preferably controls the entire cruise control system 30. The microcontroller unit 32 may include a processor and memory with embedded software, or program instructions (i.e., a program), for controlling the cruise control system 30.

The microcontroller unit 32 is preferably operated by the power supply 34 of the scooter 10 (diagrammatically represented in FIG. 1) to control the cruise control system 30. The scooter power supply 34 may be a conventional 24V power supply. The scooter power supply 34 may be connected to a voltage regulator circuit or voltage regulator (hereinafter voltage regulator circuit 36). The voltage regulator circuit 36 may raise or lower the voltage of the electrical mobility scooter 10. According to an exemplary embodiment, the voltage regulator circuit 36 is a step-down voltage regulator circuit that converts the voltage of the scooter power supply 34 to a lower voltage, which is output from the voltage regulator circuit 36 to the microcontroller unit 32. In the exemplary embodiment, the scooter power supply 34 is a 24V power supply. The voltage regulator circuit 36 converts the 24V voltage, which is input from the scooter power supply 34 to the voltage regulator circuit 36, to a 5V voltage for the cruise control system 30, which is output from the voltage regulator circuit 36. The voltage regulator circuit 36, in turn, may be connected to the microcontroller unit 32. The voltage from the voltage regulator circuit 36 is input to the microcontroller unit 32. It should be appreciated that a bypass filter 38 may be connected between the voltage regulator circuit 36 and the microcontroller unit 32 to smooth or even out fluctuations or noise in the 5V voltage from the voltage regulator circuit 36.

The controls 14, 16, 18, and optionally the controls 20, 22 are connected to the microcontroller unit 32. As mentioned above, these may include the "Cruise", "Set", "Cancel", "Acceleration" and "Deceleration" buttons. Additionally, as stated above, visual indicators 40, 42 may be connected to the microcontroller unit 32. The visual indicators 40, 42 may be in the form of LEDs or other suitable lights, or other suitable visual indicators, that illuminate, or otherwise provide a visual indication, to indicate when the "Cruise" button is pressed and in the "On" state and when the speed of the electric mobility scooter 10 is set.

A programming port 44 may be connected to the microcontroller unit 32 to enable the microcontroller unit 32 (or the memory thereof) to be programmed and/or updated with the embedded software and/or program instructions (i.e., a program).

A multiplexer 46 is comprised of multiple inputs, including device inputs and control inputs, and an output. The microcontroller unit 32 may be connected to the control inputs of the multiplexer 46, for controlling the multiplexer 46. In the exemplary embodiment, the output of the multiplexer 46, in turn, is connected to the scooter controller 48, preferably, to three pins (e.g., Throttle High Reference, Throttle Wiper and Throttle Low Reference pins) of the scooter controller 48. The multiplexer 46 is also connected to the scooter throttle control 49 and a system throttle control 50, the latter of which may be comprised of a digital potentiometer, via the device inputs. The multiplexer 46 switches connections to the scooter controller 48 between the scooter throttle control 49 and system throttle control 50. That is to say, the scooter throttle control 49 is effectively replaced by the system throttle control 50 when the speed is set. The system throttle control 50 is controlled by the microcontroller unit 32. For example, in the exemplary embodiment, a wiper setting of the system throttle control 50 is controlled by the microcontroller unit 32. In an exemplary embodiment, resistance between the wiper and either end point of the system throttle control 50 varies (e.g., linearly) with respect to a digital code sent to the system throttle control 50 by the microcontroller unit 32.

Figure 3A:
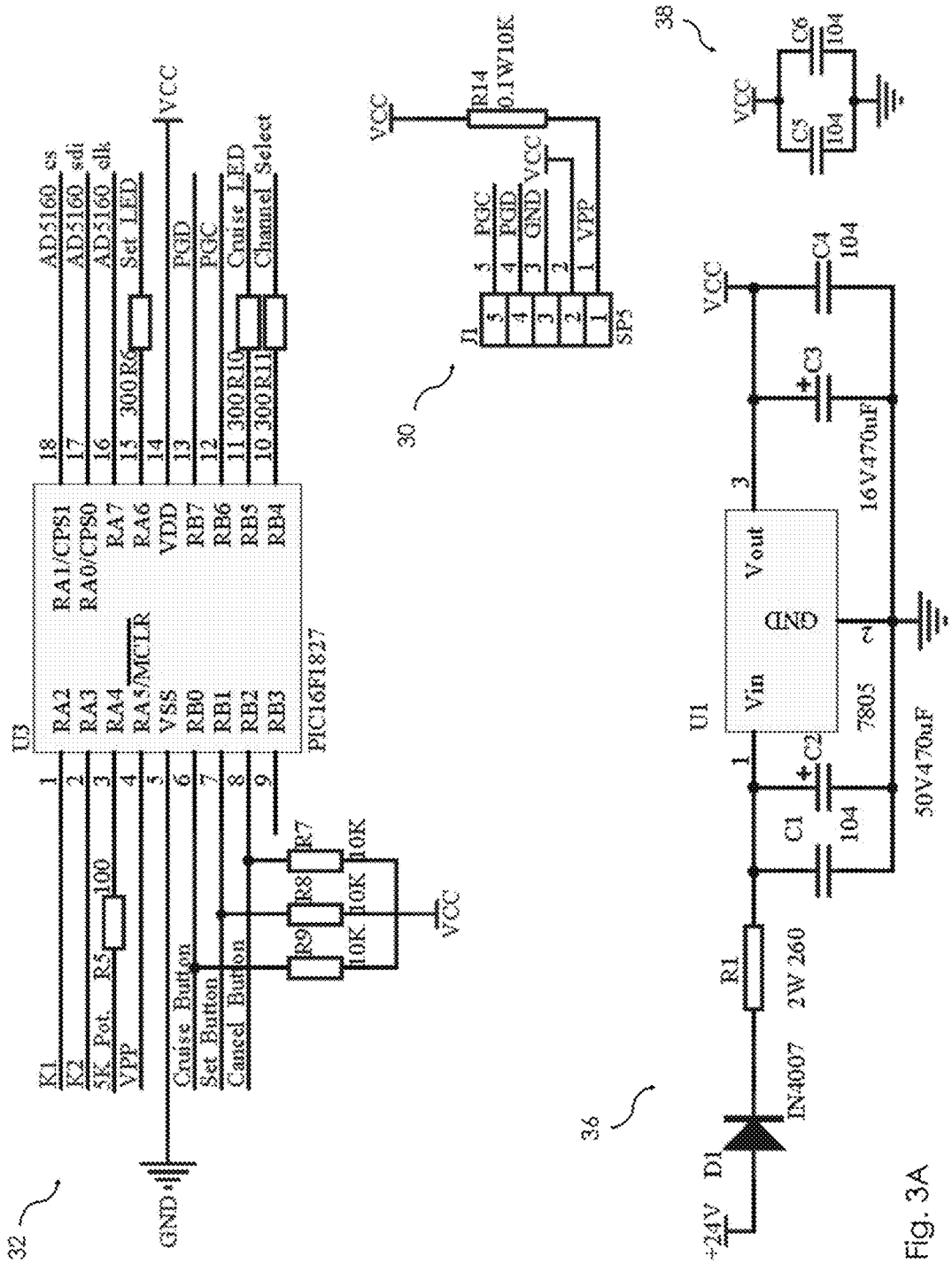
FIGS. 3A-3B are collectively a schematic representation of an exemplary embodiment of the basic cruise control system.
Figure 3B:
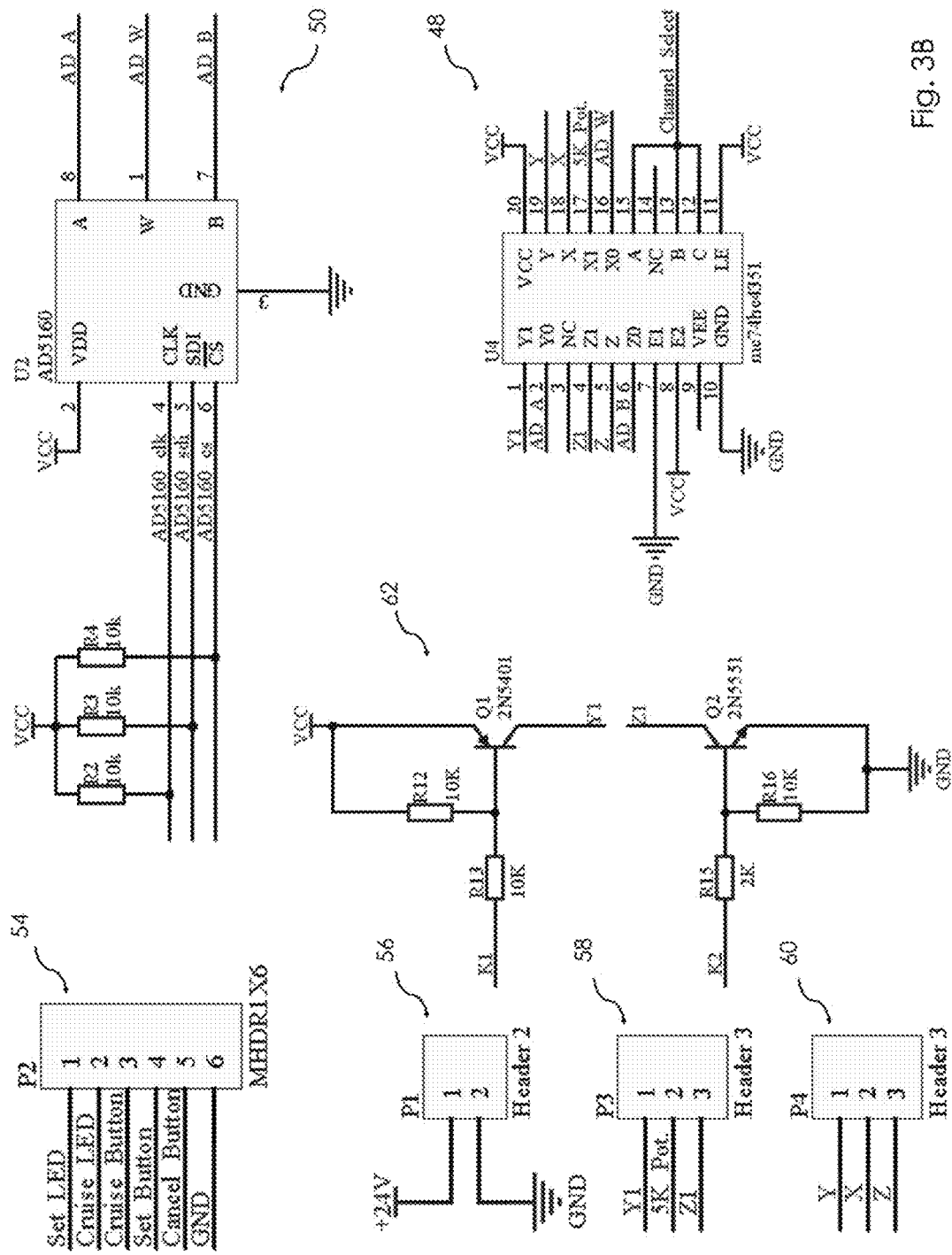

FIGS. 3A-3B show a schematic representation of an exemplary cruise control system 30. It should be understood that the cruise control system 30 and its various components may be supported in relation to a circuit board (not shown). As stated above, the cruise control system 30 has a microcontroller unit 32, which controls the cruise control system 30. As stated above, the microcontroller unit 32 may include a processor and memory with software (e.g., programmed instructions, or a program) for controlling the cruise control system 30. The microcontroller unit 32 may run a specific program written to process inputs and outputs of a multiplexer 46. The microcontroller unit 32 may be programmable via a programming port 44.

A voltage regulator or voltage regulator circuit 36 may be provided to convert the voltage of the power supply 34 from the scooter 10 to a system voltage for the cruise control system 30 (e.g., to convert a 24V voltage to a 5V voltage). Bypass capacitors may function as the bypass filter 38 to smooth or even out fluctuations in the system voltage.

A connector 54 may connect the controls (i.e., buttons, switches or other suitable controls) to the microcontroller unit 32. In the illustrated embodiment, a connector 54 provides a connection to the microcontroller unit 32 for the controls 14, 16, 18 (e.g., the "Cruise", "Set", and "Cancel" buttons). The connector 54 may also provide a connection to the microcontroller unit 32 for visual indicators 40, 42 (e.g., the LEDs, or other suitable lights, or other suitable visual indicators).

Connectors 56, 58, 60 may also be provided for connecting the microcontroller unit 32 to the power supply 34 of the scooter 10, to connect to the scooter throttle control 49 of the scooter 10, and to connect to pins (e.g., Throttle High Reference, Throttle Wiper and Throttle Low Reference pins) of the scooter controller 48.

Two transistors, generally located at 62 when viewing FIG. 3B, may be controlled by the microcontroller unit 32 to connect the scooter throttle control 49 to the system voltage from the voltage regulator circuit 36 and to ground when the cruise control system 30 is activated and the system throttle control 50 replaces the scooter throttle control 49.

The system throttle control 50 replaces the scooter throttle control 49 when the cruise control system 30 is activated. The microcontroller unit 32 controls a wiper setting. Resistance between a wiper W and either end point A, B of a fixed resistor of the system throttle control 50 varies (e.g., linearly) with respect to a digital code sent to the system throttle control 50 by the microcontroller unit 32.

As stated above, a multiplexer 46 switches connections to the scooter controller 48 between the scooter throttle control 49 of the scooter 10 and the system throttle control 50.

Figure 4:
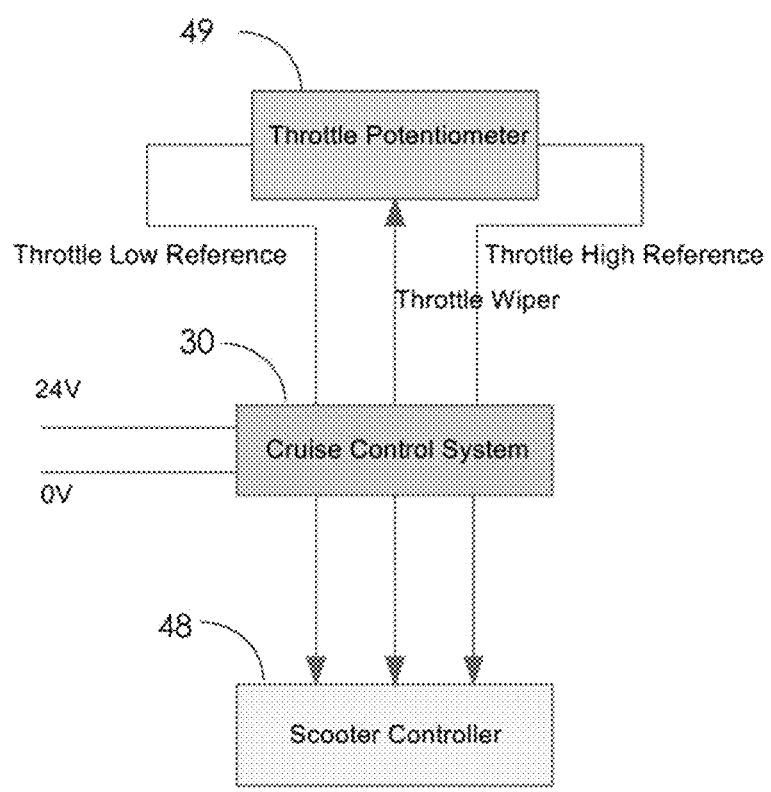
FIG. 4 is a diagrammatic representation of an exemplary embodiment of the cruise control system as an add-on or retrofit module with simple wiring to connect with an existing mechanical throttle potentiometer and an existing scooter controller made by a mobile scooter controller manufacturer.

To make it easy to add the cruise control system 30 to existing products, the cruise control system 30 is designed to be an add-on or retrofit module with simple wiring to connect with the scooter throttle control 49 and the scooter controller 48 made by, for example, PG DRIVES TECHNOLOGY, CURTIS INSTRUMENTS, DYNAMIC CONTROLS, or any other main mobile scooter controller manufacturer, as diagrammatically represented in FIG. 4. It should be appreciated that connectors 56, 58, 60 connecting the microcontroller unit 32 to the power supply 34, the scooter throttle control 49 and the scooter controller 48 can be structured and configured to mate with proprietary connectors of the mobile scooter manufacturers.

Figure 5A:
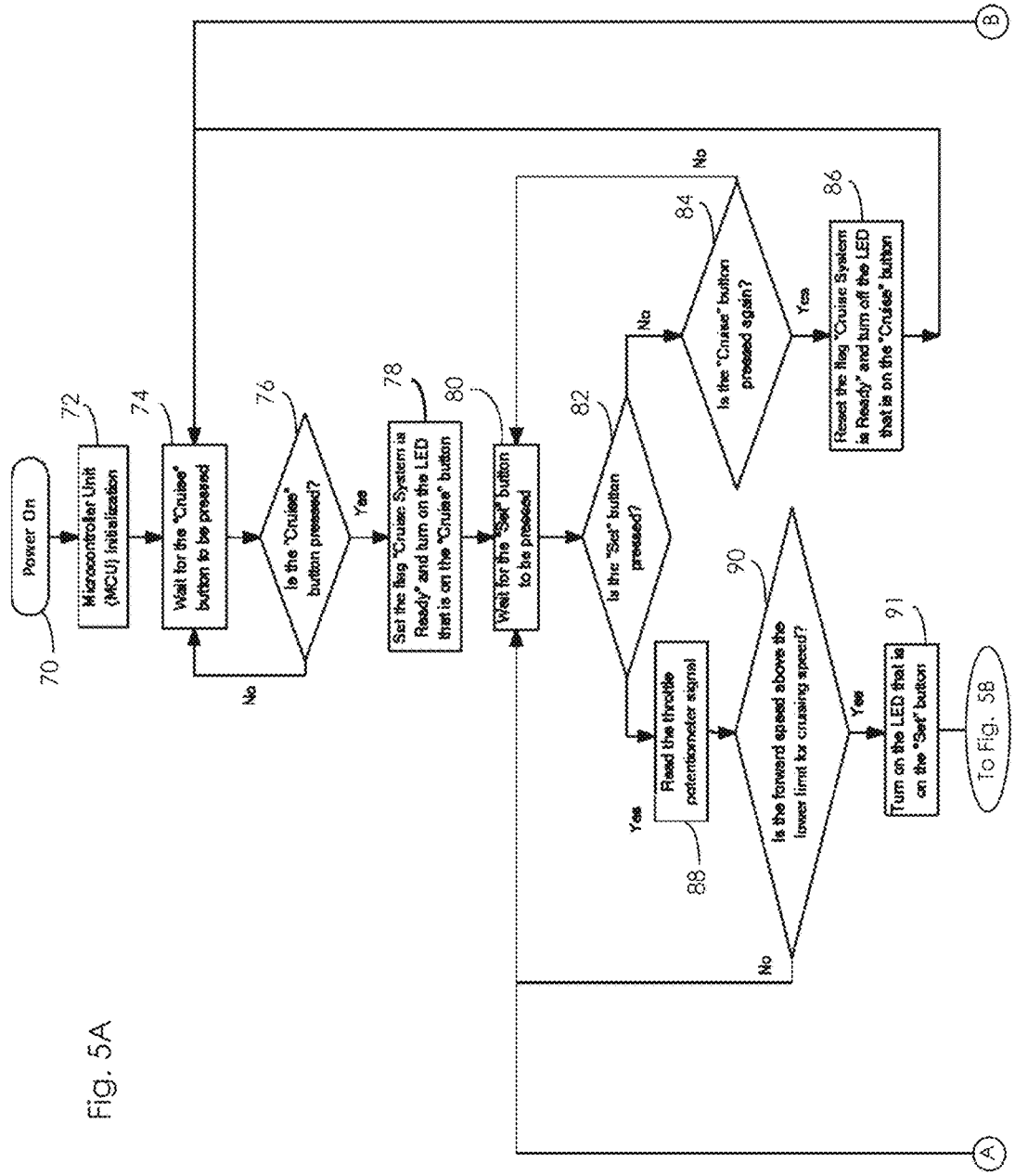
FIGS. 5A-5B are collectively a flow diagram depicting the operation of an exemplary embodiment of the cruise control system.
Figure 5B:
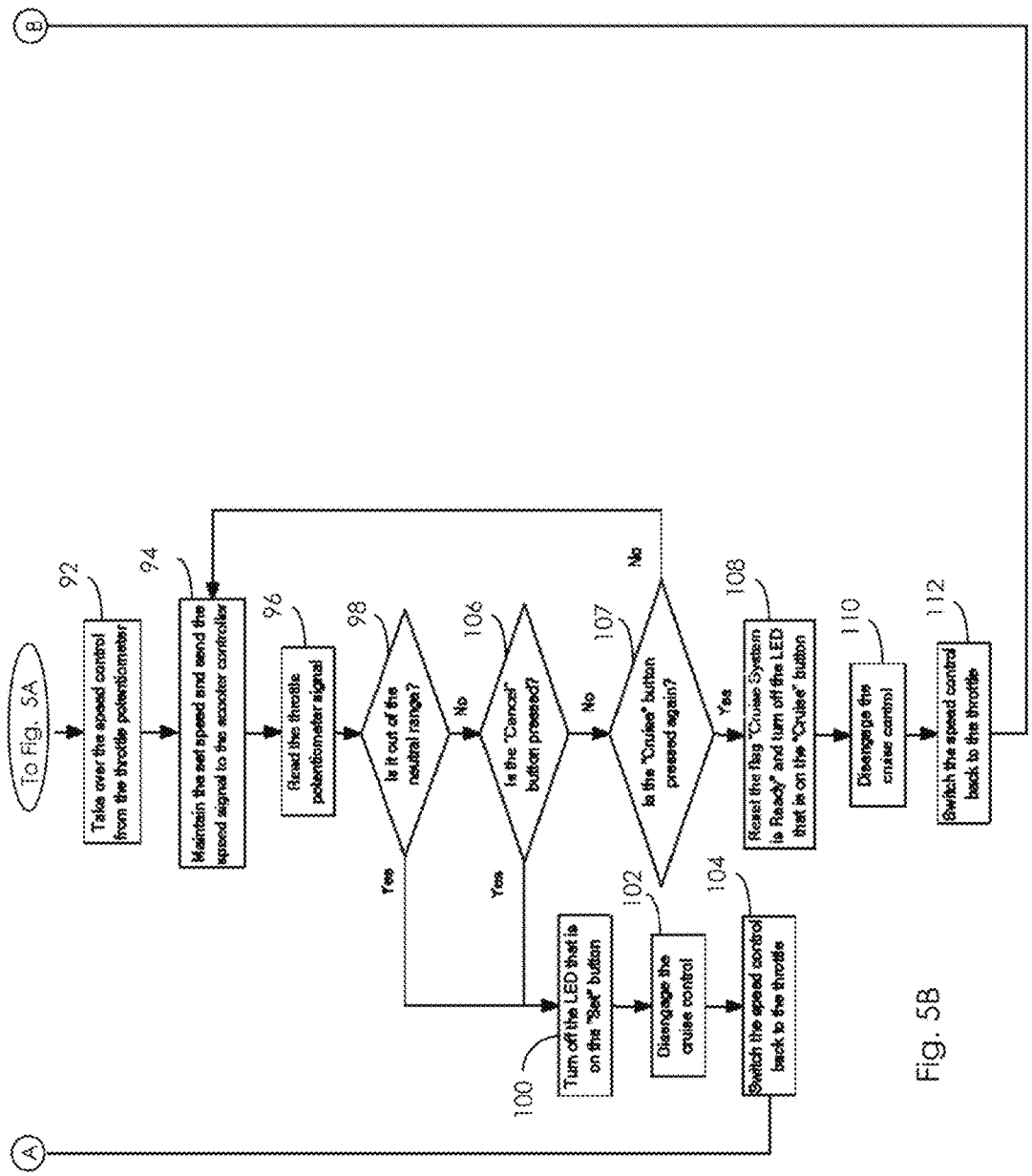

Now, with regard to FIGS. 5A-B, there is illustrated a flow diagram depicting an exemplary method of operation of an exemplary cruise control system 30.

The method begins at starting point 70, wherein the electric mobile scooter 10 is powered "On". At process block 72, the microcontroller unit 32 is initialized. At process block 74, the method waits for the "Cruise" button (i.e., the first control 14) to be pressed. At decision block 76, a determination is made whether the "Cruise" button is pressed. If the "Cruise" button is not pressed, the method loops back to process block 74, awaiting the "Cruise" button to be pressed. If the "Cruise" button is pressed, then the method proceeds to process block 78, wherein a flag "Cruise System is Ready" is set and the "Cruise" LED or other suitable light or indicator (i.e., first visual indicator 40) is turned on to illuminate the "Cruise" button or otherwise provide a visual indicator.

At process block 80, the method waits for the "Set" button (i.e., the second control 16) to be pressed. At decision block 82, a determination is made whether the "Set" button is pressed. If the "Set" button is not pressed, the method proceeds to decision block 84, wherein a determination is made whether the "Cruise" button is pressed again. If the "Cruise" button is not pressed again, then the method loops back to process block 80, awaiting the "Set" button to be pressed. If the "Cruise" button is pressed again, then the method proceeds to process block 86 to reset the flag "Cruise System is Ready" and turn off the "Cruise" LED, or other suitable light that illuminates the "Cruise" button, or other visual indicator. If the "Set" button is pressed, then the signal of the scooter throttle control 49 of the scooter 10 is read at process block 88.

Next, at decision block 90, a determination is made whether the forward speed of the scooter 10 is above the lower limit for the cruising speed. If the forward speed of the scooter 10 is not above the lower limit for the cruising speed, the method loops back to process block 80, awaiting the "Set" button to be pressed. If the forward speed of the scooter 10 is above the lower limit for the cruising speed, the "Set" LED or other suitable light is turned on to illuminate the "Set" button, or the system otherwise provides a visual indicator, at process block 91.

At process block 92, the microcontroller unit 32 takes over the speed control from the scooter throttle control 49 of the scooter 10. At process block 94, the set speed is maintained and the set speed signal is sent to the scooter controller 48.

At process block 96, the signal of the scooter throttle control 49 of the scooter 10 is read.

At decision block 98, a determination is made whether the signal of the scooter throttle control 49 is out of neutral range (i.e., whether the driver is pressing the scooter throttle control 49 to disengage the cruise control). If the signal of the scooter throttle control 49 is out of neutral range (i.e., the driver is pressing the throttle control 49 to disengage the cruise control), then the "Set" LED or other suitable light that illuminates the "Set" button, or other visual indicator, is turned off at process block 100. At process block 102, the cruise control is disengaged. At process block 104, the speed control of the scooter 10 switches back to the scooter throttle control 49, and the method loops back to process block 80, awaiting the "Set" button to be pressed.

If the signal of the scooter throttle control 49 is not out of neutral range (i.e., the driver is not pressing the scooter throttle control 49 to disengage the cruise control), at decision block 98, then a determination is made whether the "Cancel" button (i.e., the third control 18) is pressed at decision block 106. If the "Cancel" button is pressed, then the "Set" LED or other suitable light that illuminates the "Set" button, or other visual indicator, is turned off, at process block 100, and the method proceeds through process blocks 102 and 104. If the "Cancel" button is not pressed, then a determination is made whether the "Cruise" button is pressed again, at decision block 107. If the "Cruise" button is not pressed again, then the method loops back to process block 94, to maintain the set speed and send the set speed signal to the scooter controller 48. If the "Cruise" button is pressed again, then at process block 108, the flag "Cruise System is Ready" is reset and the "Cruise" LED or other suitable light that illuminates the "Cruise" button, or other visual indicator, is turned off. At process block 110, the cruise control is disengaged. At process block 112, the speed control is switched back to the scooter throttle control 49 of the scooter 10, and the method loops back to process block 74, where the method waits for the "Cruise" button to be pressed.

It should be appreciated that the cruise control system 30 described above is not intended to be limited by the description or the accompanying drawings. The control 12, which is diagrammatically represented in FIG. 1, can take on other configurations. The cruise control system 30 is not intended to be limited to the diagram shown in FIG. 2, and can take on other configurations. Moreover, the cruise control system 30 is not intended to be limited to the schematic representation shown in FIGS. 3A-B, but can take on other configurations, including but not limited to a configuration with connectors for additional buttons, including the "Accelerate" and "Decelerate" buttons (i.e., the fourth and fifth controls 20, 22).

Further, it should be clearly understood that the cruise control system 30 is not intended to be limited to the operation of the system depicted in the flow diagram in FIGS. 5A-B. Clearly, the operation of a cruise control system 30 could include operations associated with the "Accelerate" and "Decelerate" buttons for the advanced cruise control system.

In the flow diagram presented herein, certain functions and/or processes can be combined, performed simultaneously or in a different order, or perhaps omitted, without deviating from the spirit and scope of the described invention. While the method functions or processes are described and illustrated in a particular sequence, use of a specific sequence of steps is not meant to imply any limitations on the invention. Changes may be made with regard to the sequence of steps without departing from the spirit or scope of the present invention. Use of a particular sequence is therefore, not to be taken in a limiting sense, and the scope of the present invention is defined only by the appended claims.

As will be appreciated by one skilled in the art, embodiments of the present invention may be embodied as a system, device, and/or method. Accordingly, embodiments of the present invention may take the form of an entirely hardware embodiment or an embodiment combining software and hardware embodiments that may all generally be referred to herein as a "circuit", "module" or "system."

Aspects of the present invention are described herein with reference to the flow diagram of a method, apparatus (system) and computer program product according to embodiments of the invention. It will be understood that each block of the flow diagram, and combination of blocks in the flow diagram, can be implemented by computer program instructions. These computer program instructions may be provided to a processor of a general-purpose computer, special purpose computer (e.g., the microcontroller unit 32), or other programmable data processing apparatus to produce a machine, such that the instructions, which execute via the processor of the computer or other programmable data processing apparatus, create means for implementing the functions/acts specified in the flow diagram block or blocks.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiment or embodiments disclosed for carrying out this invention, but that the invention will include all embodiments, including combinations thereof, falling within the scope of the appended claims.

The terminology used herein is for the purpose of describing a particular embodiment or embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment or embodiments were chosen and described to best explain the principles of the invention and the practical application, and to enable others of ordinary skill in the art to understand the invention for various embodiments with various modifications as are suited to the particular use contemplated.

What is claimed is:

1. A cruise control system for retrofit on an electrical mobility scooter having at least one driven wheel driven by a motor assembly, via a power supply and a scooter controller, the speed of the motor assembly being controlled by a scooter throttle control, which produces a signal that is received by the scooter controller, which correspondingly controls the speed of the motor assembly, the cruise control system comprising:
   a module comprising:
      a microcontroller unit connectable to the scooter power supply, the microcontroller unit being operable to control the cruise control system;
      a multiplexer connected to the microcontroller unit, and being connectable between the scooter controller and the scooter throttle control so that the signal produced by the scooter throttle control is communicated through the multiplexer to the microcontroller unit,
      a system throttle control is connected between the microcontroller unit and the multiplexer, and
      a plurality of controls is connected to the microcontroller unit, the plurality of controls comprising:
         a first control for selectively activating and deactivating the cruise control system, and
         a second control for setting the speed of the motor assembly by the system throttle control, and allowing the user to release control of the motor assembly by the scooter throttle control.

2. The cruise control system of claim 1, wherein the microcontroller unit comprises a processor and memory with a program for processing by the processor for controlling the cruise control system.

3. The cruise control system of claim 1, further comprising a programming port connected to the microcontroller unit to enable the program to be loaded and updated into the memory.

4. The cruise control system of claim 1, wherein the plurality of controls further comprises a third control for releasing control of the motor assembly by the system throttle control.

5. The cruise control system of claim 4, wherein the plurality of controls further comprises a fourth control for causing the electrical mobility scooter to accelerate, and a fifth control for causing the electrical mobility scooter to decelerate.

6. The cruise control system of claim 5, wherein the plurality of controls is comprised of buttons, wherein the first control is a bi-stable latching button and the remaining controls are momentary push buttons.

7. The cruise control system of claim 1, further comprising at least one visual indicator to provide at least one visual indication that the cruise control system is activated and/or that the speed of the motor assembly is set.

8. The cruise control system of claim 1, wherein the at least one visual indicator is an LED.

9. The cruise control system of claim 1, further comprising a voltage regulator connected between the power supply and the microcontroller unit, wherein the voltage regulator comprises a step-down voltage regulator that converts a voltage of the scooter power supply to a lower voltage, which is output from the voltage regulator to the microcontroller unit.

10. The cruise control system of claim 9, further comprising a bypass filter connected between the voltage regulator and the microcontroller unit to smooth or even out fluctuations or noise in the voltage from the voltage regulator.

11. The cruise control system of claim 1, wherein the scooter controller has at least three pins, comprising a Throttle High Reference, Throttle Wiper and Throttle Low Reference, to which the scooter throttle control and the system throttle control are selectively connected through the multiplexer, wherein the multiplexer switches connections to the scooter controller between the scooter throttle control and system throttle control.

12. The cruise control system of claim 1, wherein the module is a self-contained unit, comprising an assembly of electronic components and associated wiring, including a processor and memory with software, which performs a defined task and is linked with the scooter controller, power supply, and scooter throttle control.

\* \* \* \* \*